United States Patent [19]

Tung et al.

[11] Patent Number: 5,057,583
[45] Date of Patent: Oct. 15, 1991

[54] POLYMERIZATION PROCESS AND INITIATOR SYSTEM THEREFOR

[75] Inventors: Lu H. Tung; Jerald A. Griggs, both of Midland, Mich.

[73] Assignee: The Dow Chemical Company, Midland, Mich.

[21] Appl. No.: 415,427

[22] Filed: Oct. 2, 1989

Related U.S. Application Data

[63] Continuation-in-part of Ser. No. 287,505, Dec. 19, 1988, abandoned, which is a continuation of Ser. No. 913,927, Oct. 1, 1986, abandoned, which is a continuation-in-part of Ser. No. 754,329, Jul. 12, 1985, abandoned.

[51] Int. Cl.$^5$ .......................... C08F 4/48; C08F 36/04
[52] U.S. Cl. .................................. 526/175; 502/157; 526/340.2; 525/316
[58] Field of Search ......................................... 526/175

[56] References Cited

U.S. PATENT DOCUMENTS

| | | | |
|---|---|---|---|
| 2,856,391 | 10/1958 | Diem | 260/94.2 |
| 2,975,160 | 3/1961 | Zelinski | 526/173 |
| 3,285,894 | 11/1966 | Lim et al. | 526/175 |
| 3,294,768 | 12/1966 | Wofford | 526/174 |
| 3,886,130 | 5/1975 | Lim et al. | 502/157 |
| 4,172,190 | 10/1979 | Tung et al. | 526/173 |
| 4,196,154 | 4/1980 | Tung et al. | 260/665 R |
| 4,200,718 | 4/1980 | Tung et al. | 526/173 |
| 4,201,729 | 5/1980 | Tung et al. | 260/665 R |
| 4,205,016 | 5/1980 | Tung et al. | 260/665 R |
| 4,401,800 | 8/1983 | Hall | 526/175 |
| 4,427,837 | 1/1984 | Tung et al. | 525/314 |
| 4,431,777 | 2/1984 | Tung et al. | 525/314 |

FOREIGN PATENT DOCUMENTS 1492154 4/1966 France .
59-50245 12/1984 Japan .

*Primary Examiner*—Edward J. Smith
*Attorney, Agent, or Firm*—Douglas N. Deline

[57] ABSTRACT

Narrow molecular weight telechelic and/or block copolymers are prepared by anionic polymerization using multifunctional lithium initiator in combination with a $C_{2-16}$ lithium alkoxide.

5 Claims, No Drawings

POLYMERIZATION PROCESS AND INITIATOR SYSTEM THEREFOR

CROSS-REFERENCE TO RELATED APPLICATION

This is a continuation in part, of application Ser. No. 287,505 filed Dec. 19, 1988, now abandoned which is a continuation of application Ser. No. 913,927 filed Oct. 1, 1986, now abandoned, which is a continuation-in-part of Ser. No. 754,329, filed July 12, 1985, now abandoned.

BACKGROUND OF THE INVENTION

Telechelic and block copolymers are well known in the art and are employed for a variety of purposes. As block copolymers one of the more interesting varieties is of the configuration $AB(BA)_n$ wherein n has a value of from about 1–10. One of the more interesting of block copolymers of this variety is that obtained when n is 1, or the block copolymer has a simple ABA configuration. Such block copolymers are often prepared to have a polystyrene-polybutadiene-polystyrene configuration; the A blocks may be homopolymers or copolymers. Usually the B block is an elastomer such as a butadiene polymer or an isoprene polymer segment. To obtain block copolymers of maximum uniformity, it is usually desirable to initiate polymerization employing a multifunctional lithium compound. In the case of an ABA block copolymer, a difunctional compound would be employed. In the case of an $AB(BA)_3$ block copolymer, a tetrafunctional initiator would be utilized. Generally, the multifunctional lithium containing initiators do not initiate as rapidly as smaller monofunctional compounds, and the polymerization product has a broader molecular weight range than is often desired. If it were possible to prepare block copolymers having very narrow molecular weight distribution which are often desirable for some applications, one could then blend such narrow molecular weight distribution block copolymers to obtain a product having almost any desired molecular weight distribution.

It would be desirable if there were available an improved process for the preparation of block copolymers of the $AB(BA)_n$ variety.

It would also be desirable if there were available an improved process for the preparation of block copolymers of the $AB(BA)_n$ variety which would result in product having a narrow molecular weight distribution.

It would also be desirable if there were available an initiator system which would provide such polymers having a narrow molecular weight distribution.

These benefits and other advantages in accordance with the present invention are achieved in a solution polymerization of at least one anionically polymerizable monomer wherein polymerization of the monomer is initiated in the presence of a multifunctional lithium containing soluble initiator compound to initiate polymerization and subsequently polymerize the anionically polymerizable monomer, the improvement which comprises employing as initiator system a mixture of the multifunctional lithium compound and a lithium alkoxide, the lithium alkoxide containing 2–16 carbon atoms and the equivalent ratio of alkoxide to multi-functional lithium compound being from about 0.05 to 2.

Also contemplated in the scope of the present invention is a polymerization initiator system comprising a hydrocarbon solvent, a multifunctional lithium containing polymerization initiator and the above described lithium alkoxide wherein the equivalent ratio of alkoxide to dilithium compound is from about 0.05 to 2.

Anionic polymerization is well known in the art, for example U.S. Pat. Nos. 4,431,777 and 4,427,837. Multifunctional initiators are well known and have been used in polymerization. Such initiators and their use are shown in the following U.S. Patents, the teachings of which are incorporated by reference thereto: U.S. Pat. Nos. 4,169,115; 4,172,100; 4,172,190; 4,427,837; 4,196,154; and 4,205,016.

Particularly desirable multifunctional lithium containing compounds are selected from the group consisting of the formula:

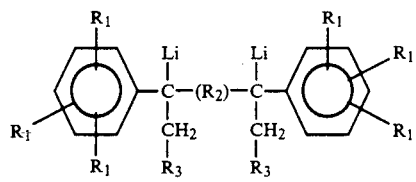

wherein
$R_1$ is independently each occurrence hydrogen or an inert radical having from 0 to 16 carbon atoms;
$R_2$ is a divalent organic radical having at least 6 carbon atoms, $R_2$ having at least one aromatic ring and the aromatic ring being directly attached to a carbon which is attached to an aromatic ring of the above formula, with the further limitation $R_2$ contains carbon and hydrocarbon, and optionally oxygen; oxygen when present is present only in the configuration of a diphenyl oxide;
$R_3$ is selected from the group consisting of alkyl, cycloalkyl, and aromatic radicals containing from 1 to 20 carbon atoms;
and especially preferred are initiating compounds of the Formula:

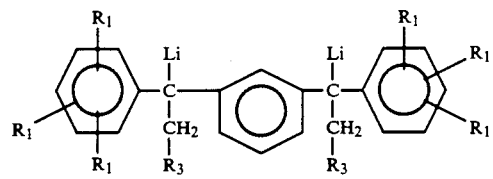

wherein $R_1$ and $R_3$ are as previously defined.

Examples of the preceeding compounds and their use are set forth in U.S. Pat. Nos. 4,196,154 and 4,205,016.

In a preferred embodiment, $R_1$ is selected from the group consisting of hydrogen, alkyl, cycloalkyl, alkoxy, aryl and mixtures thereof.

Polydiene monomers suitable for use in the practice of the present invention include 1,3-butadiene, isoprene and mixtures thereof.

Advantageously alkenyl aromatic monomers are also employed. By the term alkenyl aromatic monomer is meant a monomer of the formula:

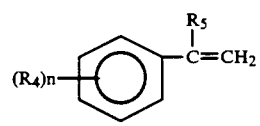

where n is an integer from 0 to 3, $R_4$ is an alkyl radical containing up to 5 carbon atoms and $R_5$ is hydrogen or methyl. Preferred alkenyl aromatic monomers include styrene, vinyltoluene, (all isomers alone or in admixture); particularly desirable is paravinyltoluene, or methyl styrene and the like.

Solvents useful for the practice of the present invention include hydrocarbons, both aliphatic and aromatic, as well as cycloaliphatic and include hexane, benzene, toluene, cyclohexane and in some instances a monomer can be employed also as a solvent, such as in the case of alpha-methylstyrene. In addition, a relatively polar solvent such as tetrahydrofuran, may also be utilized in combination with the initiator system of the invention in order to achieve varied microstructure in the resulting polydiene, as is previously known in the art.

Lithium alkoxides suitable for the practice of the present invention correspond to the formula LiOR wherein OR is an alkoxide moiety containing 2–6 carbon atoms and are readily prepared by the reaction of an alkyl lithium compound with an aliphatic alcohol having from 2 to 16 carbon atoms. Such alcohols may be monohydric or polyhydric and include ethanol, isopropyl alcohol, ethylene glycol and the like. Generally it is desirable to prepare the lithium alkoxide in solution, using an alkyl lithium compound as the lithium donor and a solvent compatible with the solvent used in the polymerization. The alkoxide may be prepared at any convenient temperature up to the polymerization temperature.

The multifunctional lithium compound and the lithium alkoxide may be combined at any time prior to initiation of polymerization. Generally, the equivalent ratio of alkoxide to the polylithium compound is from about 0.05 to 2 and advantageously from about 0.1 to 1.

Advantageously the lithium alkoxide can be made in the hydrocarbon solution of an organolithium compound, such as n-butyllithium by addition of the appropriate alcohol thereto.

The invention is further illustrated but not limited by the following examples.

EXAMPLE 1

A nitrogen purged 2-liter air-tight stirred reactor was charged with 1350 milliliters of alphamethylstyrene and 0.78 milliequivalents of isopropanol. The alphamethylstyrene isopropanol mixture was blanked with 2.3 milliequivalents of secondary butyllithium to produce lithium isopropoxide in the alpha-methylstyrene solution. After the blanking step, 12 grams of styrene and 177 grams of isoprene were added to the reactor. The heating jacket of the reactor was set at a temperature of 45° Centigrade. When the temperature of the reaction mixture reached 39° C. 1.78 millimoles or 3.56 milliequivalents of 1,3-phenylene-bis(3-methyl-1-phenylpentylidene)bis-(lithium), were added. The equivalent ratio of the alkoxide to dilithium compound was 0.22. After the addition of the dilithium compound, the jacket control setting was raised to 50° C. After a period of about 35 minutes, the reaction mixture turned a deep red. The temperature setting was then raised to 60° C. and polymerization continued for an additional 25 minutes.

Polymerization was terminated by the addition of isopropanol. The resulting polymer was an isoprene triblock with a center block of polyisoprene, and end blocks of styrene-alpha-methylstyrene polymer. The molecular weight was determined employing gel permeation chromatography. The chromatogram showed a single peak and indicated a weight average molecular weight of 213,800 and an apparent weight average molecular weight to number average average molecular weight ratio of 1.14.

For purposes of comparison the foregoing was repeated with the following exceptions: No isopropanol was added prior to blanking and the quantity of difunctional initiator was 1.79 millimoles rather than 1.78. On examination of the polymer by gel permeation chromatography, 2 peaks were observed with the main peak indicating a weight average molecular weight of 185,900 and an apparent weight average molecular weight to number average molecular weight ratio of 1.23.

EXAMPLE 2

The procedure of Example 1 was repeated with the exception that the dilithio initiator was 1,3-phenylene-bis(3-methyl-1,[4-methylphenyl]pentylidene)bis(lithium). 0.78 milliequivalents of lithium isopropoxide was generated in the reaction mixture to give an equivalent ratio of the alkoxide to dilithium compound of 0.22. The recovered polymer showed a single peak in the gel permeation chromatograph indicating weight average molecular weight of 239,100 and an apparent weight average molecular weight to number average molecular weight ratio of 1.17.

For purposes of comparison the foregoing procedure was repeated with the exception that no isopropyl alcohol was added to the reaction mixture until termination. Recovered triblock polymer had a weight average molecular weight of 293,100 as indicated by the peak of the gel permeation chromatography and an apparent weight average molecular weight to number average molecular weight ratio of 1.27.

EXAMPLE 3

A 1-liter nitrogen purged round bottom glass reactor was charged with 400 milliliters of toluene and 34 grams of isoprene. The mixture was heated to 50° C. and 1.24 millimoles of 1,3-phenylene-bis(3-methyl-1-phenylpentylidene)bis-(lithium) with lithium isopropoxide in toluene was added as an initiator. The equivalent ratio of isopropoxide to the lithium compound was 0.11. At one hour and 45 minutes after the addition of the initiator, the reaction was terminated by the addition of glacial acetic acid. Polyisoprene was the product which had a weight average molecular weight as determined by gel permeation chromatography 53,000 and a weight average and a number average molecular weight ratio of 1.35. The gel permeation chromatogram indicated 2 peaks.

For comparative purposes the foregoing procedure was repeated with the exception that no lithium isopropoxide was employed. The resultant product had a weight average molecular weight of 64,300. The weight average molecular weight to number average molecular weight ratio was 1.50, and the gel permeation chromatogram contained 2 peaks spaced further apart than that obtained when employing the lithium isopropoxide.

When the foregoing procedure without lithium isopropoxide was repeated using butadiene in place of isoprene, the resulting butadiene had a weight average molecular weight of 51,100. The molecular weight average to number average molecular weight ratio was 1.54 and 2 distinct peaks were observed in the gel permeation chromatogram.

EXAMPLE 4

The procedure of Example 3 was repeated except that the equivalent ratio of lithium isopropoxide to the dilithium compound was 0.21. The polyisopropene recovered indicated a weight average molecular weight of 42,300 and the weight average molecular weight to number average molecular weight ratio is 1.30 and the gel permeation chromatography chromatogram showed only a single peak.

EXAMPLE 5

The procedure of Example 3 was repeated except that the equivalent ratio in the initiator was 0.50. The product recovered had a weight average molecular weight of 41,200. The gel permeation chromatography chromatogram indicated only a single peak and the weight average molecular weight to number average molecular weight ratio was 1.19.

EXAMPLE 6

The procedure of Example 3 was repeated with the exception that the equivalent ratio of dilithium compound in the initiator to alkoxide was 1.01. The resultant polyisoprene had a weight average molecular weight of 44,000 the gel permeation chromatography showed only 1 peak. The weight average molecular weight to number average molecular weight ratio was 1.24.

EXAMPLE 7

The procedure of Example 3 was repeated with the exception that lithium tertiary-butoxide was employed in place of lithium isopropoxide. The polyisopropene recovered had a molecular weight of 55,500. The molecular weight average to number molecular weight average ratio was 1.35. The gel permeation chromatogram indicated 2 peaks which were closer together than the peaks obtained in the comparative experiment in Example 3.

EXAMPLE 8

The procedure of Example 3 was repeated with the exception that lithium octanoxide was employed in place of lithium isopropoxide. The polyisoprene recovered had a weight average molecular weight of 51,100. The weight average molecular weight to number molecular weight average ratio was 1.45. The gel permeation chromatograph indicated 2 peaks. However, the peaks were closer together than that obtained in the comparative process of Example 3.

EXAMPLE 9

The procedure of Example 5 was repeated with the exception that butadiene was employed instead of isoprene. The resultant polybutadiene had a weight average molecular weight of 30,100. The molecular weight average to number molecular weight average ratio was 1.09 and only a single peak was observed on the gel permeation chromatogram.

Comparative Example 1-No Coinitiator

To a nitrogen purged 2 liter air-tight stirred reactor were added 1401 mL toluene, purified by passing through an alumina packed column. To the same vessel, 244 mL of isoprene purified through an alumina packed column and subsequently distilled after contacting with a dibutyl magnesium solution was added. A 60 mL quantity of this reaction mixture was withdrawn from the reaction vessel and titrated with a toluene solution of a difunctional organo-lithium initiator, 1,3-phenylene-bis(3-methyl-1-phenylpentylidene)bis-(lithium), until a faint reddish color appeared. Based on the equivalency of the difunctional initiator used in the titration, it was determined that slightly more than 0.16 milliequivalent of impurities was still present in the reaction mixture. 0.16 milliequivalents of an s-butyllithium solution was added to the reaction mixture to blank out the impurities. The reaction mixture in the reactor was then heated to 55° C. and 1.89 millimoles of the above difunctional organo-lithium initiator solution was added to initiate the polymerization of isoprene. The temperature of the reaction mixture rose to about 80° C. in about 15 minutes after initiation and then started to subside. The polymerization was allowed to proceed for another 30 minutes and then was terminated by the addition of isopropyl alcohol. The gpc chromatogram of the polymer recovered had two peaks. The weight average molecular weight determined from the gpc chromatogram was 220,000 and the weight to number average molecular weight ratio was 1.36.

Comparative Example 2-Methanol Coinitiator

The conditions of comparative Example 1 were substantially repeated except that before titration and blanking of the residual impurities, 0.7 mL of a 1:10 methanol/toluene mixture was added. When the appropriate amount of s-butyllithium was added for blanking, about 1.6 milliequivalents of lithium methoxide was formed as a result of the reaction between methanol and s-butyllithium. After blanking, the difunctional organo-lithium initiator solution was added as in experiment C8600404-16. The gpc chromatogram of the polyisoprene recovered had two peaks. The weight average molecular weight was 202,000 and the weight to number average molecular ratio was 1.37. These results showed that lithium methoxide had no effect in controlling the molecular weight distribution of isoprene polymerization.

EXAMPLE 10

The conditions of Comparative Example 1 were substantially repeated except that before titration and blanking of the residual impurities, 1 mL of a 1:10 ethanol/toluene mixture was added. When the appropriate amount of s-butyllithium was added for blanking, about 1.7 milliequivalents of lithium ethoxide was formed as a result of the reaction between ethanol and s-butyllithium. After blanking, the difunctional organo-lithium initiator solution was added. The gpc chromatogram of the polyisoprene recovered had only one peak. The weight average molecular weight was 161,000 and the weight to number average molecular ratio was 1.15. These results showed that lithium ethoxide was effective in controlling the molecular weight distribution of isoprene polymerization.

Comparative Example 3

The conditions of Comparative Example 1 were substantially repeated except that 14 mL of tetrahydrofuran distilled in the presence of sodium-naphthalene complex were added. The reaction mixture in the reactor was then heated to 50° C. and the difunctional organo-lithium initiator solution added. The gpc chromatogram of the polymer recovered had one peak but with a distinct low molecular weight shoulder. The weight average molecular weight determined from the gpc chromatogram was 162,000 and the weight to number average molecular weight ratio was 1.22. The microstructure of the polyisoprene as determined by proton nmr was 50 percent 3,4-vinyl and 50 percent 1,4-cis. The microstructure of polyisoprene made in toluene without the addition of tetrahydrofuran would be about 9 percent 3,4-vinyl and 91 percent 1,4-cis.

EXAMPLE 11

The conditions of Comparative Example 3 were substantially repeated excepting that before titration and blanking of the residual impurities, 1.4 mL of a 1:10 isopropyl alcohol/toluene mixture was added. When the appropriate amount of s-butyllithium was added for blanking, about 1.7 milliequivalents of lithium isopropoxide was formed as a result of the reaction between isopropyl alcohol and s-butyllithium. The difunctional initiator solution was then added and the polymerization reaction was allowed to proceed. The gpc chromatogram for the recovered polymer had a single peak without any shoulder. The weight average molecular weight was 173,000 and the weight to number average molecular weight ratio was 1.17. The microstructure determined by nmr was 51 percent 3,4-vinyl and 49 percent 1,4-cis. These results showed that the presence of lithium isopropoxide was effective in controlling the molecular weight distribution of polyisoprene polymerized in solvents containing a polar additive.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a solution polymerization of at least one conjugated diene monomer said solution comprising a hydrocarbon solvent wherein polymerization of the monomer is initiated in the presence of a multifunctional lithium containing soluble initiator the improvement which comprises employing as initiator a mixture comprising a multifunctional lithium compound corresponding to the formula:

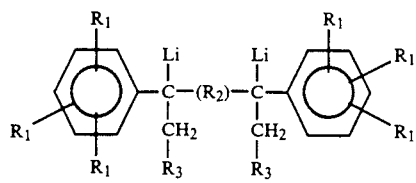

wherein
$R_1$ is independently each occurrence hydrogen or an inert radical having from 0 to 16 carbon atoms;
$R_2$ is a divalent organic radical having at least 6 carbon atoms, $R_2$ having at least one aromatic ring and the aromatic ring being directly attached to a carbon which is attached to an aromatic ring of the above formula, with the further limitation $R_2$ contains carbon and hydrogen, and optionally oxygen; oxygen when present is present only in the configuration of a diphenyl oxide;
$R_3$ is selected from the group consisting of alkyl, cycloalkyl, and aromatic radicals containing from 1 to 20 carbon atoms; and
a lithium alkoxide of the formula LiOR the alkoxide (OR) containing 2–16 carbon atoms and the equivalent ratio of lithium alkoxide to multi-functional lithium compound being about 0.05 to 2.

2. The solution polymerization of claim 1 wherein an alkenyl aromatic monomer and a conjugated diene are polymerized.

3. The solution polymerization of claim 1 wherein the conjugated diene monomer is butadiene.

4. The solution polymerization of claim 1 wherein the conjugated diene monomer is isoprene.

5. The solution polymerization of claim 2 wherein the alkenyl aromatic monomer is selected from the group consisting of styrene and α-methylstyrene.

* * * * *